Sept. 28, 1937.    C. THUMIM ET AL    2,094,478
MOTOR CONTROL SYSTEM
Filed Jan. 14, 1936
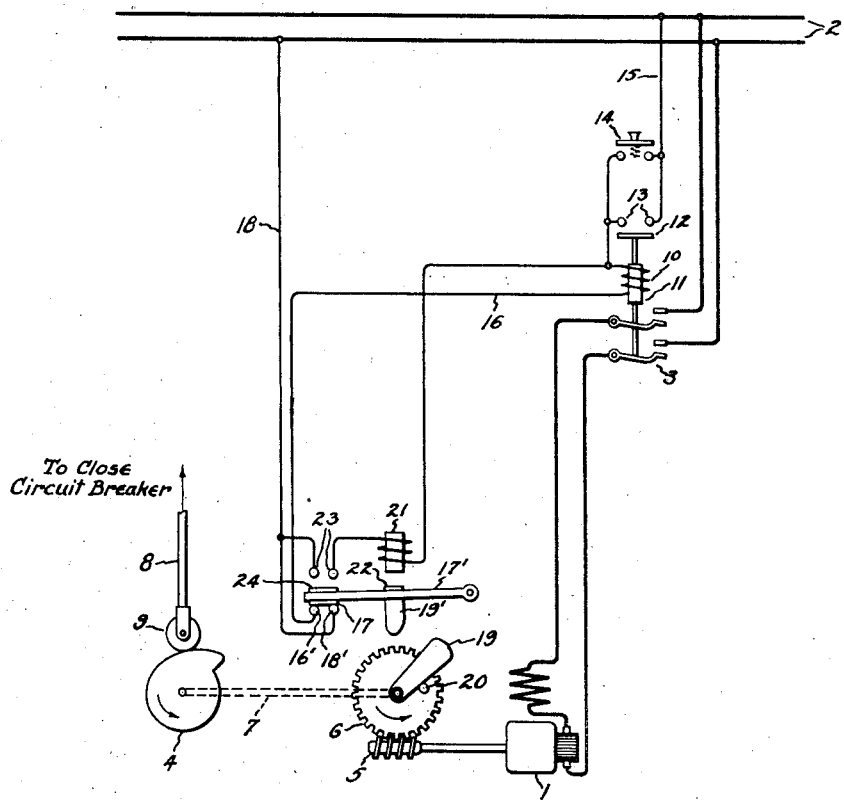
Inventors:
Carl Thumim,
Thellwell R. Coggeshall,
by Harry E. Dunham
Their Attorney.

Patented Sept. 28, 1937

2,094,478

UNITED STATES PATENT OFFICE 2,094,478

MOTOR CONTROL SYSTEM

Carl Thumim, Yeadon, and Thellwell R. Coggeshall, Philadelphia, Pa., assignors to General Electric Company, a corporation of New York Application January 14, 1936, Serial No. 59,080

8 Claims. (Cl. 172—239)

Our invention relates to motor control systems, more particularly to a system for controlling a motor in accordance with a single predetermined operation thereof, such as a circuit breaker closing operation, so as not only to insure a complete operation but also to prevent recurrent operations of said motor during a single control operation by the operator.

In motor operating mechanisms, such as cam mechanisms for example, it is generally desirable to deenergize the motor after predetermined rotation of the operating cam. Where the operating cam is employed for closing an electric circuit breaker, for instance, a single rotation of the cam is sufficient to complete the circuit closing operation, after which it is highly desirable to deenergize the motor and stop rotation of the cam in order to prevent "pumping" or repeated reclosing operations in the event that the circuit breaker is closed on a short circuit and fails to remain closed. Where the motor energizing means is directly under the control of the operator, such as by a push button switch control, the operator may, by holding the push button closed too long, cause pumping of the motor mechanism in the absence of suitable control means.

It is a principal object of our invention to provide an improved motor control system of the character above referred to, particularly applicable to circuit breaker closing mechanisms, wherein pumping or recurrent circuit closing motor operations are prevented during a single control operation by the operator.

Our invention will be more fully set forth in the following description referring to the accompanying drawing, and the features of novelty which characterize our invention will be pointed out with particularity in the claims annexed to and forming a part of this specification.

Referring to the drawing, the single figure thereof is a diagrammatic illustration of a motor control system for a cam mechanism embodying our invention.

As illustrated, an electric motor 1 is arranged to be energized from a supply circuit 2, the energization of the motor circuit being controlled by a motor switch 3. When the motor energizing switch 3 is closed, the motor 1 is energized so as to rotate an operating cam 4 through suitable connections, such as the worm and gear drive 5, 6 and rotatable shaft 7. The cam 4 is operatively connected to means to be actuated in any suitable manner, such as by a longitudinally guided operating rod 8 having a roller 9 engaging the cam actuating face. As above pointed out, the rod 8 may in a preferred application be connected to an electric circuit breaker (not shown) for closing the breaker.

The motor switch 3 is provided with electromagnetic actuating means including a solenoid 10, the movable element 11 of which is connected to the movable contact structure of the switch 3 and is likewise provided with a bridging contact 12 for bridging the contacts 13. Energization of the solenoid 10 and closing of the motor switch 3 is effected by the operator by closing the push button control switch 14, thereby energizing the winding of the solenoid 10 from the supply circuit 2 through conductor 15, control switch 14, winding of solenoid 10, conductor 16, limit switch 17 including contacts 16' and 18', and conductor 18. It should be understood, of course, that if desired the control switch 14 may control a relay in turn controlling energization of the solenoid winding. The movable element of the solenoid 10 is thereupon actuated to close not only the motor circuit but also a holding circuit including the control switch shunting contacts 13.

For the purpose of deenergizing the motor in accordance with predetermined operation thereof, the gear 6 is operatively connected, such as by a lost-motion connection, to a member 19 for momentarily actuating and opening the limit switch 17. Specifically, the member 19 comprises an arm loosely pivoted on the cam shaft 7 and arranged to be engaged by a pin 20 secured to the gear 6. Rotation of gear 6 in the direction indicated causes the pin 20 to pick up and move positively the arm 19 into engagement with a coacting portion 19' carried by the pivoted arm 17' of the limit switch when the cam 4 reaches a predetermined position.

In view of the fact that the camming operation is comparatively fast, the member 19 is carried by its inertia past the limit switch actuating position so that it swings freely downwards out of engagement with the limit switch, independently of the pin 20 to its lower position immediately after passing its higher position. This feature is important, particularly where an automatic brake is used instantly to stop the cam when the motor is deenergized, where but a single momentary operation of the limit switch is desired.

It will be apparent that upon opening of the limit switch 17 at the contacts 16' and 18', the solenoid 10 is deenergized causing opening of the motor switch 3 and deenergization of the motor. Also the holding circuit at 12, 13 is broken. For the purpose of preventing recurrent operations of the motor as long as the operator continues to hold the push button switch 14 closed, electromagnetic means energized in accordance with operation of the limit switch is provided for holding the limit switch in motor deenergizing position as long as the push button switch 14 is held closed.

To this end an electromagnet 21 having a coacting armature 22 secured to the movable arm 17' of the limit switch is arranged to be energized from the supply circuit 2 directly through the push button switch 14 and contacts 23—24. The movable bridging contact 24, which is carried by the limit switch arm 17', is moved to the upper circuit closing position upon actuation of the limit switch 17 by the arm 19. The energizing circuit of the electromagnet 21 is thereupon closed and is held closed by the coacting armature 22 as long as the operator holds the push button switch 14 closed.

It will, therefore, be apparent that the limit switch 17 is electromagnetically locked in motor deenergizing position as long as the operator continues to hold the push button 14 closed, with the result that the motor cannot again be energized after a single camming operation until the operator releases the push button and subsequently closes it again. Upon opening of the push button, the electromagnet 21 is deenergized, allowing the limit switch arm 17' to drop to its lower position again closing the contacts 16' and 18'. The operating solenoid 10 of the motor switch 3 is thereupon in readiness for another operation in response to closing of the push button switch 14.

It should be understood that our invention is not limited to specific details of construction and arrangement thereof herein illustrated, and that changes and modifications may occur to one skilled in the art without departing from the spirit of our invention.

What we claim as new and desire to secure by Letters Patent of the United States is:

1. A motor control system comprising a supply circuit, an electric motor energized from said circuit, means controlling the energization of the motor circuit including electromagnetic actuating means, means under direct control of an operator for controlling said electromagnetic means, a limit switch actuated in accordance with predetermined operation of said motor for deenergizing said electromagnetic means and causing opening of the motor circuit, and electromagnetic means energized in accordance with the operation of said limit switch for holding said limit switch in motor deenergizing position during a single continued operation of said means under the operator's control.

2. A motor control system comprising a supply circuit, an electric motor energized from said circuit, a switch controlling the circuit of said motor, electromagnetic means controlling said switch, means including an operator's switch for energizing said electromagnetic means and causing closing of the motor circuit, a limit switch actuated in accordance with predetermined operation of said motor for deenergizing said electromagnetic means and causing opening of the motor circuit, and electromagnetic means energized in accordance with operation of said limit switch for holding said limit switch in motor deenergizing position during continued closure of said operator's switch.

3. A motor control system comprising a supply circuit, an electric motor energized from said circuit, means actuated by said motor including a rotatable shaft, a switch including electromagnetic actuating means controlling the circuit of said motor, means including an operator's switch for energizing said actuating means, a limit switch actuated in accordance with predetermined rotation of said shaft for deenergizing said actuating means for causing opening of the motor circuit, and an electromagnet energized in accordance with operation of said limit switch for holding said limit switch in a motor deenergizing position during continued closure of said operator's switch.

4. A motor control system comprising a supply circuit, an electric motor energized from said circuit, a switch including electromagnetic actuating means controlling energization of said motor, an operator's switch for energizing said actuating means, a limit switch actuated in accordance with predetermined operation of said motor for deenergizing said actuating means and causing opening of the motor circuit, an electromagnet energized in accordance with operation of said limit switch and a coacting armature operatively connected to said limit switch for holding said limit switch in motor deenergizing position during continued closure of said operator's switch.

5. A motor control system comprising a supply circuit, an electric motor energized from said circuit, means actuated by said motor including a rotatable shaft, a switch including electromagnetic actuating means controlling energization of said motor, a limit switch for deenergizing said electromagnetic actuating means causing opening of the motor circuit, a member having a lost motion connection with respect to said shaft for operating said limit switch in accordance with predetermined rotation of said shaft, and electromagnetic means energized in accordance with operation of said limit switch for holding said limit switch in motor deenergizing position while said electromagnetic actuating means is under continued and direct control of an operator.

6. A motor control system for cam operated mechanism comprising a supply circuit, an electric motor energized from said circuit, a rotatable cam operatively connected to said motor, a switch controlling energization of said motor, electromagnetic means controlling said switch, an operator's switch for controlling said motor switch, a limit switch for deenergizing said electromagnetic means, a member pivotally mounted for limited free rotational movement with respect to said cam for operating said limit switch in accordance with predetermined rotation of said cam, an electromagnet energized in accordance with operation of said limit switch, and a coacting armature operatively connected to said limit switch for holding said limit switch in motor deenergizing position during continued closure of said operator's switch.

7. A motor control system comprising a supply circuit, an electric motor energized from said circuit, a switch including an actuating solenoid controlling the motor circuit, an operator's switch for energizing said solenoid and closing the motor switch, a switch operatively connected to said solenoid shunting said operator's switch in the energized position of said solenoid, means including a rotatable cam shaft operated by said motor, a two-way limit switch normally closed in the circuit of said solenoid in one position thereof, said limit switch deenergizing said solenoid and causing opening of the motor switch in accordance with predetermined rotation of said cam shaft in the other position thereof, and an electromagnet having a coacting armature operatively connected to said limit switch, said limit switch in the last named position thereof energizing said electromagnet through said operator's switch.

8. In a motor operated cam mechanism including a supply circuit, an electric motor energized from said circuit, a rotatable cam operatively connected to said motor, a two way limit switch for causing in the same operation deenergization of the motor circuit and completion of an auxiliary circuit, said auxiliary circuit including means under control of an operator for holding said limit switch in its motor deenergizing position, means for momentarily operating said limit switch in accordance with predetermined rotation of said cam comprising a member freely mounted for limited rotational movement with respect to said cam, and means movable with said cam for positively engaging and moving said member through the operating position of said limit switch, said member being biased beyond the limit switch operating position regardless of the position of said cam.

CARL THUMIM.
THELLWELL R. COGGESHALL.